March 11, 1924.

W. CASKEY 1,486,634

ANTISLIPPING DEVICE FOR VEHICLE WHEELS

Filed Aug. 10, 1923  2 Sheets-Sheet 1

Witnesses:

Wayne Caskey.
Inventor

Attorney

March 11, 1924.

W. CASKEY 1,486,634

ANTISLIPPING DEVICE FOR VEHICLE WHEELS

Filed Aug. 10, 1923    2 Sheets-Sheet 2

Witnesses:

Wayne Caskey
Inventor

By
Attorney

Patented Mar. 11, 1924.

1,486,634

UNITED STATES PATENT OFFICE.

WAYNE CASKEY, OF WALKERVILLE, MICHIGAN.

ANTISLIPPING DEVICE FOR VEHICLE WHEELS.

Application filed August 10, 1923. Serial No. 656,745.

*To all whom it may concern:*

Be it known that I, WAYNE CASKEY, a citizen of the United States, residing at Walkerville, in the county of Oceana and State of Michigan, have invented certain new and useful Improvements in Antislipping Devices for Vehicle Wheels, of which the following is a specification.

This invention relates to certain new and useful improvements in anti-slipping devices for vehicle wheels, and has particular reference to a device of that kind which is well adapted for application to the tread of a pneumatic tire for preventing slipping in inclement weather or to prevent the vehicle from becoming mired in mud holes or the like.

The invention consists in an improvement over the common form of endless skid chain now in use and is adapted for a somewhat similar application to the wheel.

The primary object of the invention is to provide a device of the above kind which embraces the desired qualities of simplicity and durability of construction, as well as efficiency in operation.

Another object is to provide an anti-slipping device which embodies a novel and valuable form of cushion tread by means of which shocks and jars are reduced to a minimum when employing the device.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view showing an anti-slipping device constructed in accordance with the present invention and applied to a disc wheel.

Figure 3:
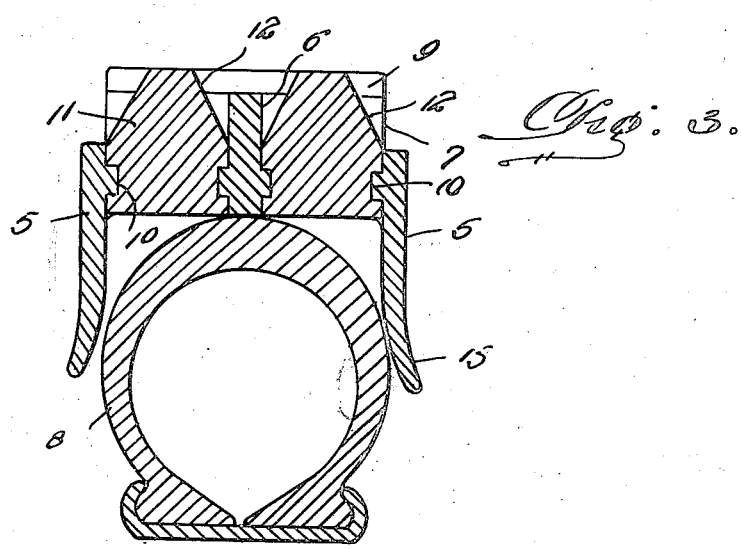
Figure 3 is an enlarged sectional view taken substantially on line 3—3 of Figure 1.
Figure 4:
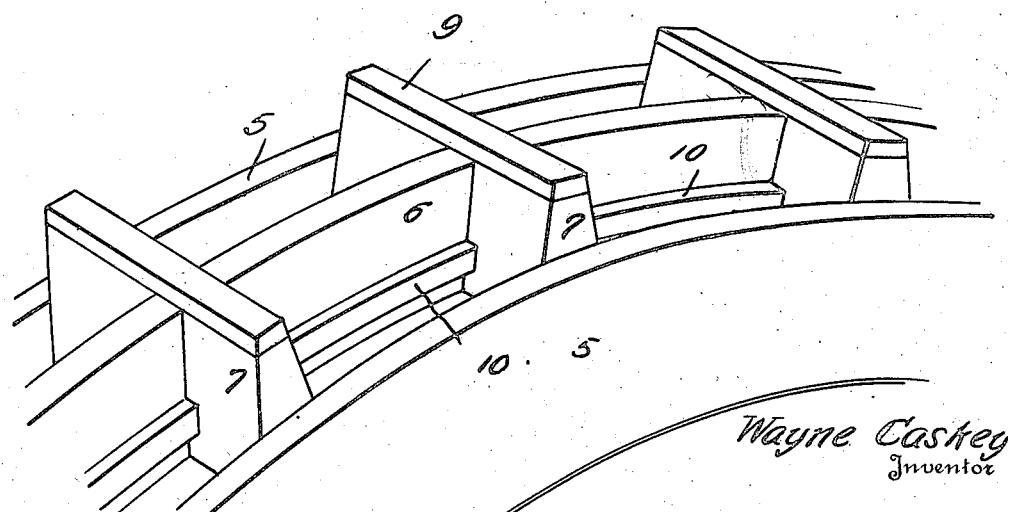
Figure 4 is an enlarged fragmentary view of the device with the cushion tread blocks removed.

Referring more in detail to the drawings, the invention embodies a pair of spaced parallel rings or flanges 5 midway between which is disposed an annular partition 6, the partition 6 being rigidly connected to the side rings 5 at suitable intervals by means of transverse partitions 7. As shown in Figures 3 and 4, the side rings 5 project inwardly beyond the inner edges of the partitions 6 and 7 so as to engage the sides of the tire 8, as shown particularly in Figure 3 whereby the device is held upon said tire, and the partitions 6 and 7 extend outwardly beyond the outer edges of the side rings 5 so that the outer edges of the latter will not contact with the ground.

Suitable cushion tread strips 9 are attached in any well known or preferred manner to the outer edges of the transverse partitions 7, and the opposed faces of the members 5 and 6 are provided with axially alined ribs 10. Cushion tread blocks 11 are fitted within the cells produced by the partitions and are provided with grooves in the sides thereof into which the ribs 10 project when the tread blocks are forced into position, whereby said blocks are effectively retained in place. However, any additional well-known means may be employed for further insuring retention of the blocks 11 in place.

The blocks 11 may be formed of rubber or other resilient composition, and as shown in Figure 3, their outer side portions are beveled as at 12 so as to provide an interrupted tread. The blocks 11 are of such size as to have their outer edges terminate in the same circumferential relation in which the outer faces of the tread strips 9 are positioned, and it will thus be seen that effective means is provided for preventing both forward or backward and sidewise skidding.

In order that the device may be applied to or removed from the tire 8, the body of the device comprising the side rings 5 and partition 6 is formed into a plurality of arcuate sections, adjacent ends of which are detachably and pivotally connected as at 13 by means of removable pivot pins or bolts. Of course, the blocks 11 at these pins will be divided as at 14 to permit the sections to be swung relative to each other. It is thus apparent that when one of the pins 13 is removed the device may be expanded to a greater diameter than the external diameter of the tire for permitting the removal of the device laterally off of the tire, while the several sections may be entirely detached from each other and arranged within a small amount of space when the device is not required for use.

In order to avoid injury to the tire 8 the inner edge portions of the rings 5 are outwardly curved as at 15.

Figure 1:
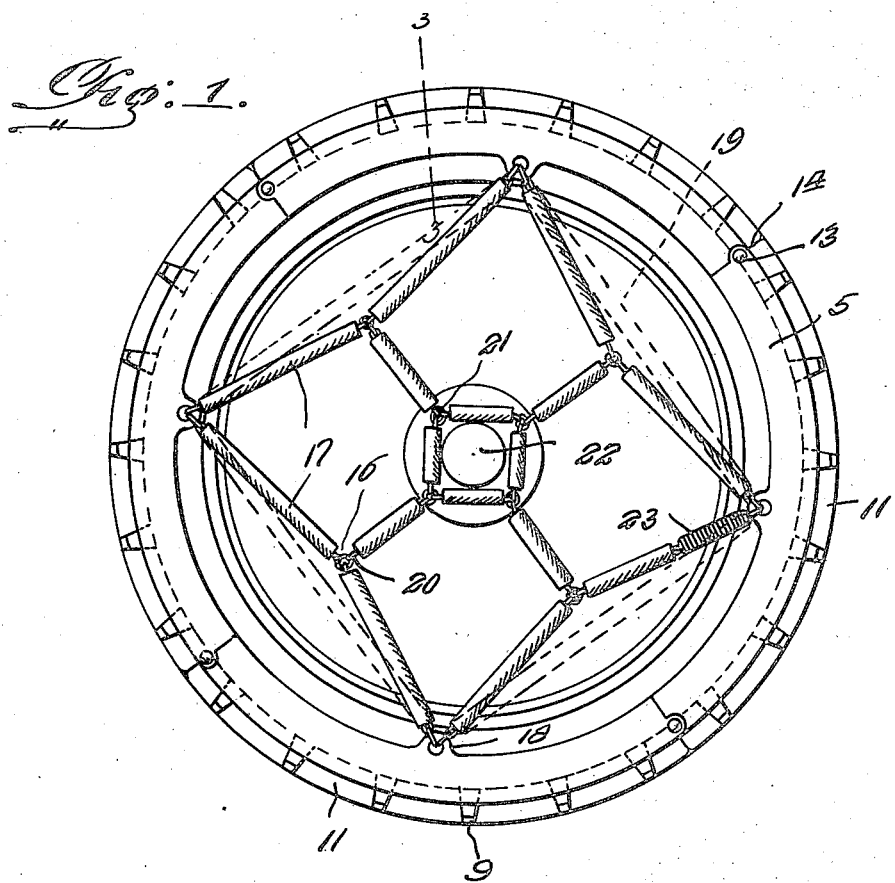
Figure 2:
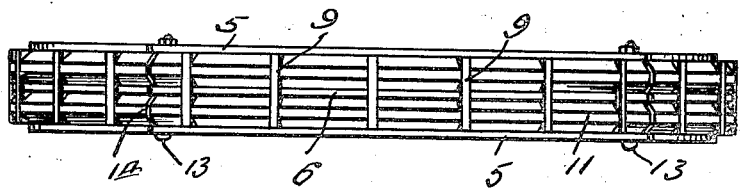
Figure 2 is a top plan view of the anti-slipping device.

In order to assist in maintaining the sections against displacement and to retain the device in position, an attaching means may be provided as shown in Figure 1. This attaching means includes a plurality of chains 16 connecting the several sections of the device and preferably covered as at 17 to prevent marring of the wheel, the ends of these chains being detachably hooked into inwardly projecting ears provided on the several sections of the rings 5.

As indicated by dotted lines at 19 these chains will extend substantially straight at the inner side of the wheel to clear the brake drum of the back wheel of the vehicle, while the chains at the outer sides of the wheels will be centrally connected to radial chains 20 whose inner ends are attached to connected chains 21 that closely surround the hub 22 of the wheel. In order to insure placing of the chains under tension a spring 23 may be employed as a connection in the series of outer chains 16.

From the foregoing description it is believed that the construction and operation, as well as the advantages of the present invention will be readily understood and appreciated by those skilled in the art.

Minor changes may be made without departing from the spirit and scope of the invention, as claimed.

What I claim as new is:

1. An anti-slipping device of the class described comprising a pair of spaced parallel rings, an annular partition disposed midway between said rings, a circular series of uniformly spaced transverse partitions rigidly connecting the rings and the partition at intervals, the rings projecting inwardly beyond the inner edges of said partitions, the partitions projecting outwardly beyond the outer edges of said rings, ribs upon opposed faces of the annular partition and the rings, and cushion tread blocks disposed within the spaces provided between the rings and the partitions and having side grooves in which said ribs are seated, said rings and the annular partition being constructed in arcuate sections detachably and pivotally joined in end to end relation.

2. An anti-slipping device of the class described comprising a pair of spaced parallel rings, an annular partition disposed midway between said rings, a circular series of uniformly spaced transverse partitions rigidly connecting the rings and the partition at intervals, the rings projecting inwardly beyond the inner edges of said partitions, the partitions projecting outwardly beyond the outer edges of said rings, ribs upon opposed faces of the annular partition and the rings, cushion tread blocks disposed within the spaces provided between the rings and the partitions and having side grooves in which said ribs are seated, said rings and the annular partition being constructed in arcuate sections detachably and pivotally joined in end to end relation, and cushion tread strips upon the outer edges of the transverse partitions, said cushion tread blocks being beveled at the outer portions of their sides and having their outer edges terminating in the same circumferential relation in which the outer surfaces of said tread strips lie, whereby an interrupted cushion tread surface is provided.

In testimony whereof I affix my signature.

WAYNE CASKEY.